June 4, 1940.  J. E. CHAMBERS  2,203,348
STOVE
Filed Aug. 23, 1937
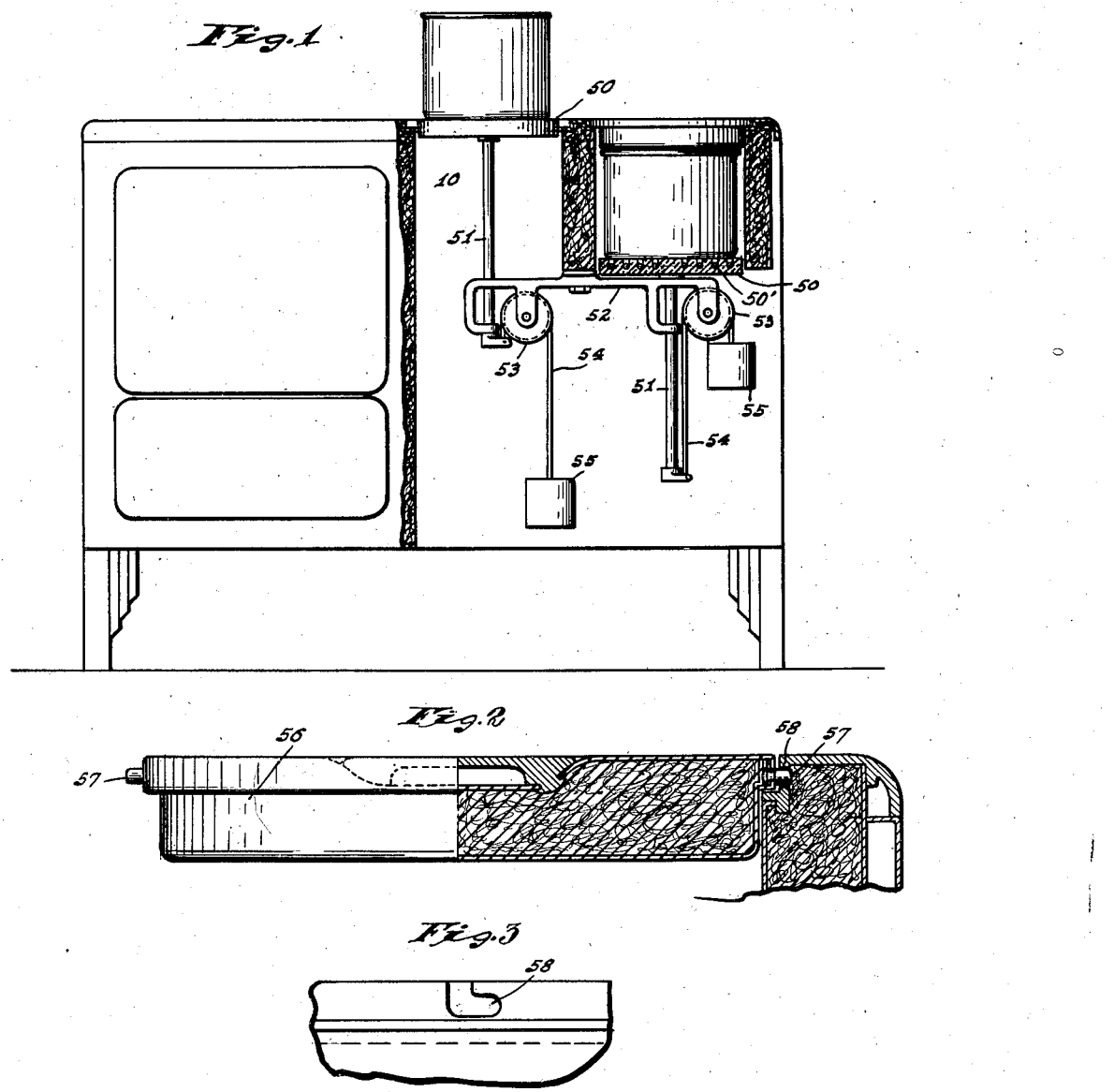
INVENTOR.
JOHN E. CHAMBERS
BY
ATTORNEYS.

Patented June 4, 1940

2,203,348

UNITED STATES PATENT OFFICE 2,203,348

STOVE

John E. Chambers, Shelbyville, Ind.

Application August 23, 1937, Serial No. 160,411

2 Claims. (Cl. 126—332)

My invention relates to cooking stoves having an insulated cooking compartment provided in its top with an opening through which the utensil containing the material to be cooked can be introduced into the compartment. In most stoves containing compartments of this type, the cooking utensil which is introduced into the compartment has horizontal dimensions only slightly smaller than those of the compartment; and it has therefore been necessary to provide some special means for supporting the vessel while it is being introduced into or removed from the compartment. The customary expedient employed for this purpose involves a lid or cover for the utensil, a handle on such lid or cover, and means for attaching the cover to the utensil so that the utensil and cover can be supported as a unit from the handle. Because of the presence of means for attaching the cover to the utensil, it has been necessary to remove the utensil from the compartment whenever it was desired to lift the cover to inspect the contents of the utensil; for the space between the sides of the utensil and the walls of the compartment was ordinarily too small to prevent release of the cover-attaching means when the utensil was in place in the compartment.

It is the object of my invention, broadly considered, to facilitate the use of cooking compartments of the type above referred to. More specifically, it is the object of my invention to eliminate the necessity for any means by which the lid or cover may be attached to the utensil, while still making it possible to raise and lower the utensil in relation to the compartment as may be desired. Still another object of my invention is to adapt a cooking compartment with a top opening for the reception of cooking utensils other than those especially designed and equipped for the purpose.

In carrying out my invention I provide the cooking compartment with a vertically movable utensil-support and in association with such utensil-support I provide means urging it upwardly. In addition, I provide for the compartment a removable lid having associated with it releasable means for holding it in place in the stove adjacent the upper end of the cooking compartment. The heating element can be either fixed in position relative to the compartment or vertically movable with the support; the former being preferred in the case of a gas heating element and the latter in the case of an electrical resistance heater.

The accompanying drawing illustrates my invention:

Fig. 1 is a front elevation of a stove with parts thereof broken away to show a counterbalanced utensil support; Fig. 2 is a fragmental view similar to Fig. 1 but on an enlarged scale showing details of the lid employed for holding the utensil and utensil-support of Fig. 1 depressed against the influence of the counterbalancing means; and Fig. 3 is a fragmental interior elevation of the wall of the cooking compartment embodied in the construction illustrated in Figs. 1 and 2.

The embodiment of my invention illustrated in the drawing comprises a utensil-support 50 mounted on the upper end of a rod 51 which is disposed centrally of the cooking compartment and which is slidably received in a suitable bracket 52 mounted beneath the compartment. The bracket 52 also carries for each compartment 10 a sheave or pulley 53 over which passes a flexible element 54 having one end secured to the lower end of the associated rod 51 and the other end secured to a counterbalance such as a weight 55.

The counterbalance is so proportioned as to be able to move upwardly the support 50, preferably when such support is carrying a full utensil, and to hold the support substantially flush with the top of the stove, as indicated at the left in Fig. 1. Because of this over counterbalancing, it is necessary to provide some means for holding the utensil and utensil-support depressed during the cooking operation. Such means conveniently takes the form of a lid 56 which closes the upper end of the associated compartment 10 and which is provided with means for holding it in place against vertical displacement. As is clear from Figs. 2 and 3, this means may take the form of a bayonet lock comprising diametrically opposite pins 57 which project from the cover and are respectively receivable in L-shaped slots 58 in the wall of the cooking compartment. With such an arrangement, when it is desired to depress a utensil from the position shown at the left in Fig. 1 to the position shown at the right, the lid 56 is placed on top and is forced downwardly. When it reaches its lowermost position the pins 57 are caused to enter the slots 58 and a partial rotation of the lid 56 then locks it in place, the counterbalance 55 holding the utensil against the lower face of the lid.

The utensil-supporting means illustrated in Fig. 1 is not suitable for use with a heating element fixed in position unless cooking utensils of the same height are used at all times; as otherwise the distance between the heating element and the bottom of the utensil would vary in a sense inverse to the depth of the utensil, and such a variation would make for inefficient heating. Therefore, when the utensil supporting means of Fig. 1 is used, I prefer to employ a heating element in the form of an electrical resistance heating element 50' and to incorporate such heating element in the support 50. Thus, irrespective of the depth of the utensil, its vertical disposition relative to the heating element will always be constant.

The construction illustrated in Fig. 1 has the advantage that the effective size of the cooking compartment is always proportioned to the depth of the utensil within it, thus tending to reduce heat losses which occur when a relatively shallow receptacle is placed in a relatively deep compartment.

I claim as my invention:

1. In a cooking device having an upwardly opening well with insulated side walls, a heating element within said well, a utensil-support above said heating element, provisions guiding said utensil-support for vertical movement, mechanism acting on said support and tending to move it upwardly, a closure, and releasable means for holding said closure in position in the upper end of said well.

2. The invention set forth in claim 1 with the addition that said heating element is movable with said support.

JOHN E. CHAMBERS.